Dec. 10, 1957   W. A. BARNES   2,815,689
COLD WELDING TOOL
Filed Dec. 1, 1954

INVENTOR.
WILLIAM A. BARNES
BY
Woodling and Krost
Attys.

United States Patent Office

2,815,689
Patented Dec. 10, 1957

2,815,689

COLD WELDING TOOL

William A. Barnes, Utica, N. Y., assignor, by mesne assignments, to Kelsey-Hayes Company, Detroit, Mich., a corporation of Delaware Application December 1, 1954, Serial No. 472,351

1 Claim. (Cl. 78—82)

This invention relates to apparatus for cold welding metals without the application of extraneous heat.

An important object of the invention is the provision of guide means for guiding a welding member in an exact predetermined rectilinear path.

Another object is the provision of a welding tool which ensures welding pressure to occur in a plane exactly perpendicular to the work and which controls the exact extent of such pressure.

A further object is the provision of a welding tool having the foregoing characteristics and, in addition, has means for causing the pressure member, after each exertion of welding pressure applied thereto, to immediately return to a position ready for a second welding operation.

Still another object is the provision of a hand welding tool having the foregoing characteristics which is inexpensive, strong, durable and can be effectively employed by inexperienced help in hard-to-get-at places.

Other objects and advantages will become apparent during the course of the following description. In the accompanying drawing forming a part of the description and wherein like parts are designated by like numerals throughout the several views.

Figure 1:
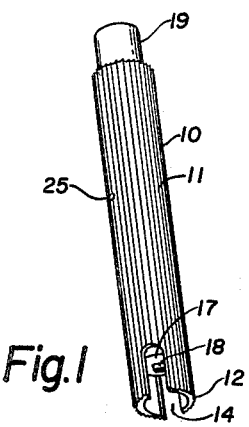
Figure 1 is a perspective view of the improved welding tool.
Figure 4:
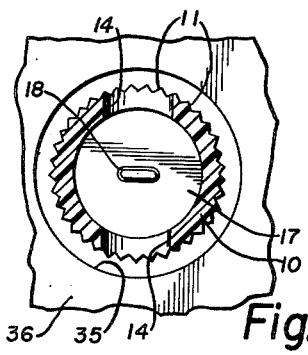
Figure 4 is a transverse section of the same on the line 4—4 of Figure 2.

In the accompanying drawing, wherein a preferred embodiment of the invention is shown for purposes of illustration and not for limitation, the numeral 10 designates a cylindrical guide sleeve made of any suitable material, but preferably of hard plastic material with a smooth interior surface and a roughened exterior surface to provide a firm hand grip. As here shown, the exterior surface is corrugated by forming it with spaced parallel raised ribs 11 extending lengthwise thereof, to not only improve the grip, but to increase the strength of the sleeve. The lower end 12 of this sleeve which is held in engagement with the work to be welded is squared with the longitudinal axis of the sleeve in order that the sleeve can be pressed against the work and held perfectly perpendicular thereto. This squared end of the sleeve is provided with a pair of slots 14 at diametrically opposite points and these slots extend inwardly lengthwise of the sleeve from its squared end in order to form sight openings through which the work and welding projection can be viewed for proper relative positioning. The work here illustrated is a piece of heavy aluminum foil W superimposed upon an aluminum sheet or strip W', but it will of course be understood that any two pieces of metal foil or any two metal sheets may be cold welded together with this tool. The usual precautions of thoroughly cleaning the contacting surfaces of the metal pieces before welding should be taken to ensure a sound weld being made with the tool.

A pressure welding member in the form of a solid cylindrical member 15 of hardened steel alloy, or the like, is freely slidably mounted lengthwise in the guide sleeve 10 to be guided thereby in an exact rectilinear path, perpendicular to the work. This positioning of the tool is achieved by firmly holding the squared end 12 of the guide sleeve 10 against the face of the work, which may be supported upon a suitable anvil A or other back-up surface. The welding end of this welding member has a broad flat end face 17 squared with the longitudinal axis of this member. This broad end face 17 forms a stop shoulder to abut the work and absorb any variation of pressure or a hammer blow and to provide for the uniform indentation necessary to achieve a good weld. The center of this broad flat end face is provided with a welding projection or indentor 18 extending perpendicularly therefrom. This welding projection may either be formed directly upon this end face, or made as a separate piece securely fastened or embedded in the end face, and may be of various shapes and sizes to adapt it to the particular work to be performed. In the present illustration, this welding projection or indentor 18 is a long and narrow rectangular formation being many times longer than it is wide. All four of its sides are preferably tapered toward its free end. The height of this projection is critical and should be such as to cause about a seventy percent reduction in the total thickness of the workpieces, as a unit, in the weld area, in the case of aluminum workpieces. The shape of this welding projection is such that when the welding member 15 is forcibly moved against the work, the projection 18 will be pressed into the work so as to indent the work and cause a flow of metal from one of the workpieces being joined into the other of said workpieces and at the same time to cause a sidewise flow of metal in the workpieces to form a sound cold pressure weld therebetween.

The welding member 15 is made about one-eighth of an inch longer than the guide sleeve 10 and is made of such weight that it may be propelled forward by an average hammer blow at a rate calculated to exert the correct amount of pressure through the welding projection 18 upon the work to effect a sound cold pressure weld. The peripheral clearance between the welding member and its guide sleeve is such as to allow perfect freedom of guided movement of the welding member so that it may be propelled missile-like through the guide sleeve when struck with a hammer blow. While the welding tool is particularly designed primarily for impacts delivered from hammer blows, equally good welds can be produced by the slow application of force to move the welding member 15 slowly under such pressure as would be exerted axially upon this member by an arbor press, or even in a hand operated vise by one jaw of the vise acting as an anvil for the work and the other jaw acting on the end 19 of the welding member to press the welding projection 18 into the work as the vise is tightened.

In order that the end 19 or striking head of the welding member 15, opposite the end having the welding projection, will be normally projected a distance beyond the upper end of the guide sleeve 10 in a position to have axial force exerted thereon or to be struck with a hammer blow and propelled through the sleeve to deliver welding pressure between the welding projection and the work, a compression coil spring 20 encircles a reduced portion 21 of the impact member within the sleeve. The upper end 22 of this spring abuts the upper shoulder 23 of the reduced portion 21 of the welding member 15, and the lower free end 24 of the spring projects laterally of its convolutions to extend through a radial perforation 25 in the guide sleeve 10. To assemble the welding member 15 with the coil spring mounted thereon, they are moved as a unit into the upper end of the guide sleeve with the free laterally extending end 24 of the spring forced radially inward against the normal tension of the spring while being guided down the inner surface of the guide sleeve until it springs back outwardly through the perforation 25 in the sleeve to its normal position. Thus, the welding member is supported within the sleeve in a ready-to-weld position by the spring, and is prevented from being pulled too far outwardly of the upper end of the guide sleeve by the lower shouldered portion of the welding member abutting the radially extending free end 24 of the spring anchored in the perforation 25.

The length of the welding member 15 is such that when the end of the projection 18 is spaced a distance from the workpiece ready for welding by positioning the squared end of the sleeve against the workpiece, the impact end 19 of the member is projected by the spring 22 far enough beyond the end of the sleeve so that it may be driven into the sleeve when struck by a single hammer blow to cause the welding projection 19 to indent and weld the work. The distance which this welding projection is pressed into the work is controlled by the height of this projection and the broad flat end face 17 of the welding member abutting the workpiece to form a positive stop in limiting welding movement of the projection.

Figure 5:
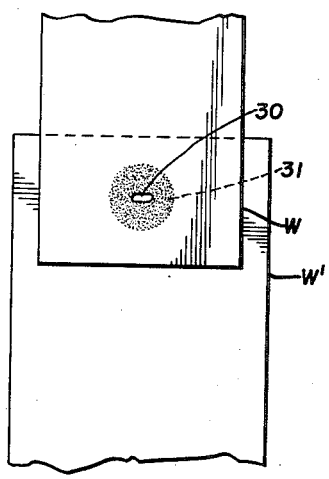
Figure 5 is a top plan of the work after being welded.
Figure 6:
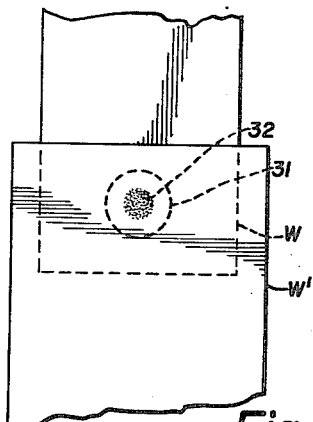
Figure 6 is a bottom plan of the work after being welded.

The condition of the work after being welded by this tool is indicated in Figures 5 and 6. The indentation made in the work by the welding projection 18 is designated by the numeral 30, and surrounding this indentation is a very slight circular marking or impression 31 formed by the broad flat surface 17 of the welding member abutting the heavy foil constituting the workpiece W. The opposite side of the work, which is the underface of the aluminum sheet or strip W' immediately opposite the weld indentation 30, appears as a circular area 32 which is concentric with and smaller than the circular impression 31 on the opposite face of the foil workpiece. The diameter of the circular area 32 is slightly greater than the longest dimension of the welding projection 18, indicating that the welding projection causes a lateral flow of metal in the work sideways in the plane of the work as well as in a plane normal to the work and in the axial direction of the welding projection, particularly in the lower workpiece W', this sidewise flow of metal appears to be greater or more extensive from the longer sides of the welding projection 18 than from its narrower ends.

Figure 2:
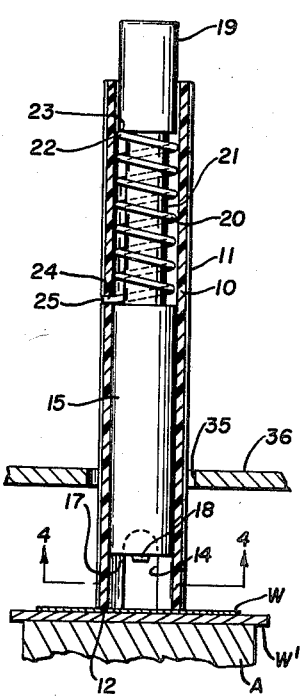
Figure 2 is an enlarged longitudinal sectional view of the tool showing it positioned ready to exert welding pressure upon parts to be welded together in an inaccessible place.
Figure 3:
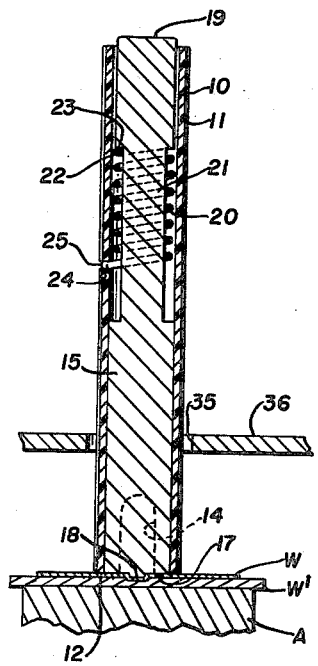
Figure 3 is a similar view showing the tool while in the act of making a weld.

As the welding member 15 is moved forwardly in the guide sleeve 10 for welding, the spring 22 is compressed so as to immediately recoil after the welding pressure is released and the weld is made to return the welding member to its normal position with the striking end 19 projecting above the guide sleeve 10 ready to have subsequent pressure applied thereto. The tool can be rapidly moved from one position of welding to another ready for a subsequent welding operation, by simply lifting the tool by the sleeve from the weld joint just completed, to an adjacent area to be welded. The tool is then positioned with its squared end 12 flush against the work whereby the operator can push down on the end 19 of the plunger member 15 with his finger until the welding projection 18 engages the work so that the operator can sight through one of the slots 14 to see exactly where the welding projection will engage and weld the work before welding pressure is exerted. This tool has been found to be desirable for use in making a series of welds in succession between thin sheets, strips or foil of like or unlike metals, such as aluminum, copper and other metals, or between aluminum and copper foil; along a continuous line or in a small area to join the two sheets or strips together where it is not possible to use larger or heavier equipment. Being very small, the tool can be handily carried in one's pocket and is always ready for use in the most inaccessible places. An example of such an inaccessible place is shown in Figures 2 and 3, wherein the tool is shown inserted through a perforation 35 in a wall structure 36 beyond which the work to be welded may be positioned in an inaccessible place and backed up with either an anvil A, or another welding projection such as 18. Obviously where two welding projections 18 are located at opposite sides of the work being welded, the combined height of these welding projections would be approximately seventy percent of the total thickness of the two pieces being welded together.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What it claimed is:

A spot weld tool for hand welding of pressure weldable sheet material, comprising, a shank having a work face surface and an anvil surface, said work face surface having a pressure weld indentor projecting therefrom, said work face having an area equivalent to the area of a circle having a diameter twice the diameter of a circle fully encompassing the said indentor, a holder, said holder having a work seat to gauge the holder to the surface of a workpiece, and resilient suspension means holding said shank with the said work face directed toward the seating surface of the holder work seat.

References Cited in the file of this patent
UNITED STATES PATENTS

| | | |
|---|---|---|
| 863,909 | Evans | Aug. 20, 1907 |
| 1,233,560 | Diffendall | July 17, 1917 |
| 1,618,764 | Lunn | Feb. 22, 1927 |
| 2,161,969 | Mange | June 13, 1939 |
| 2,522,408 | Sowter | Sept. 12, 1950 |
| 2,539,419 | Harcourt | June 30, 1951 |
| 2,701,483 | Foxon et al. | Feb. 8, 1955 |
| 2,708,972 | Park | May 24, 1955 |

FOREIGN PATENTS

| | | |
|---|---|---|
| 457,465 | Canada | June 21, 1949 |
| 509,058 | Belgium | Feb. 29, 1952 |
| 995,932 | France | Aug. 22, 1951 |

OTHER REFERENCES

"Cold Welding," published by Fortune, September 1950.